March 22, 1949.  A. O. NELSON  2,465,259
FISH SCARING DEVICE
Filed May 28, 1946  3 Sheets-Sheet 1
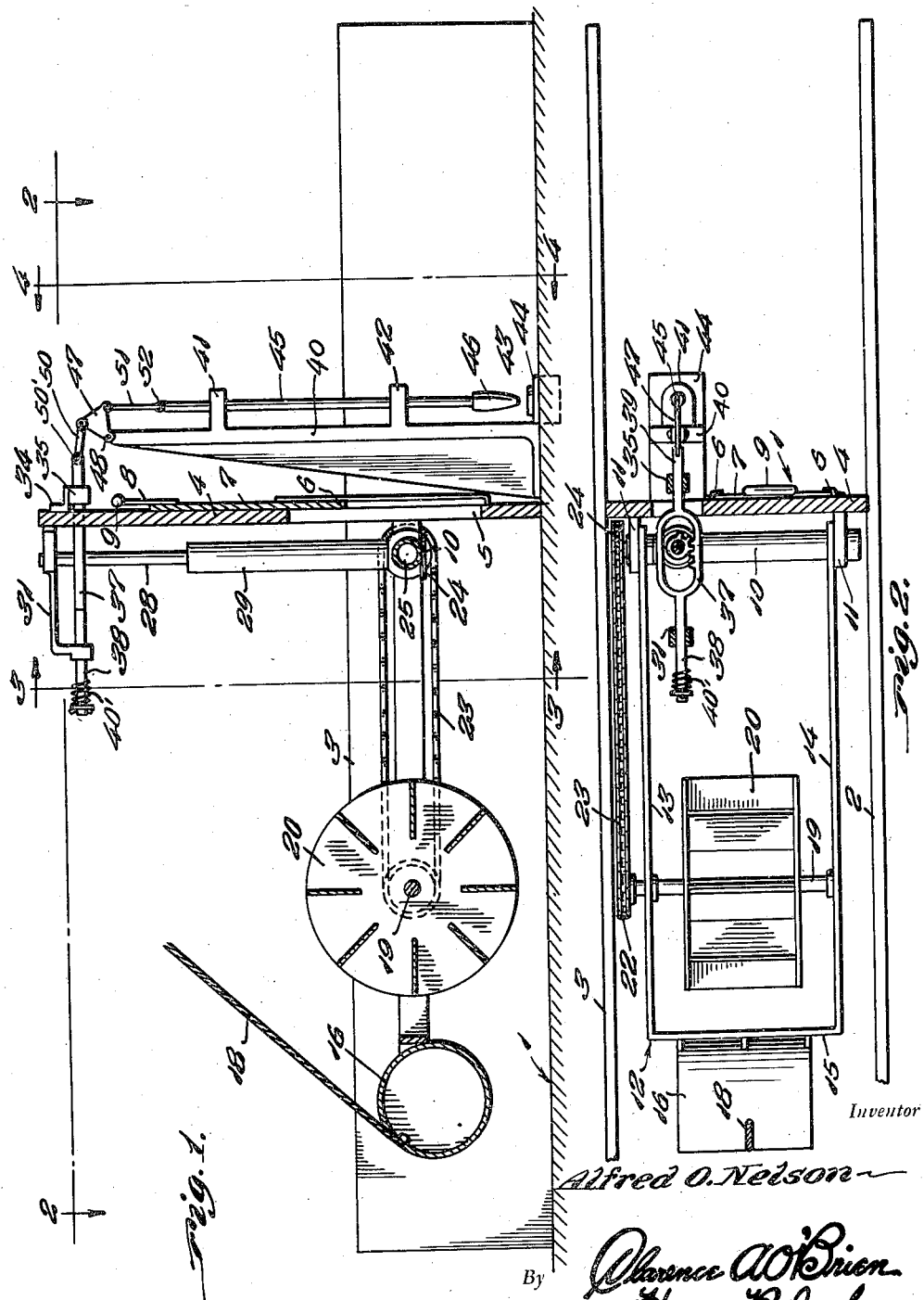
Inventor
Alfred O. Nelson
By Clarence A. O'Brien
and Harvey B. Jacobson
Attorneys

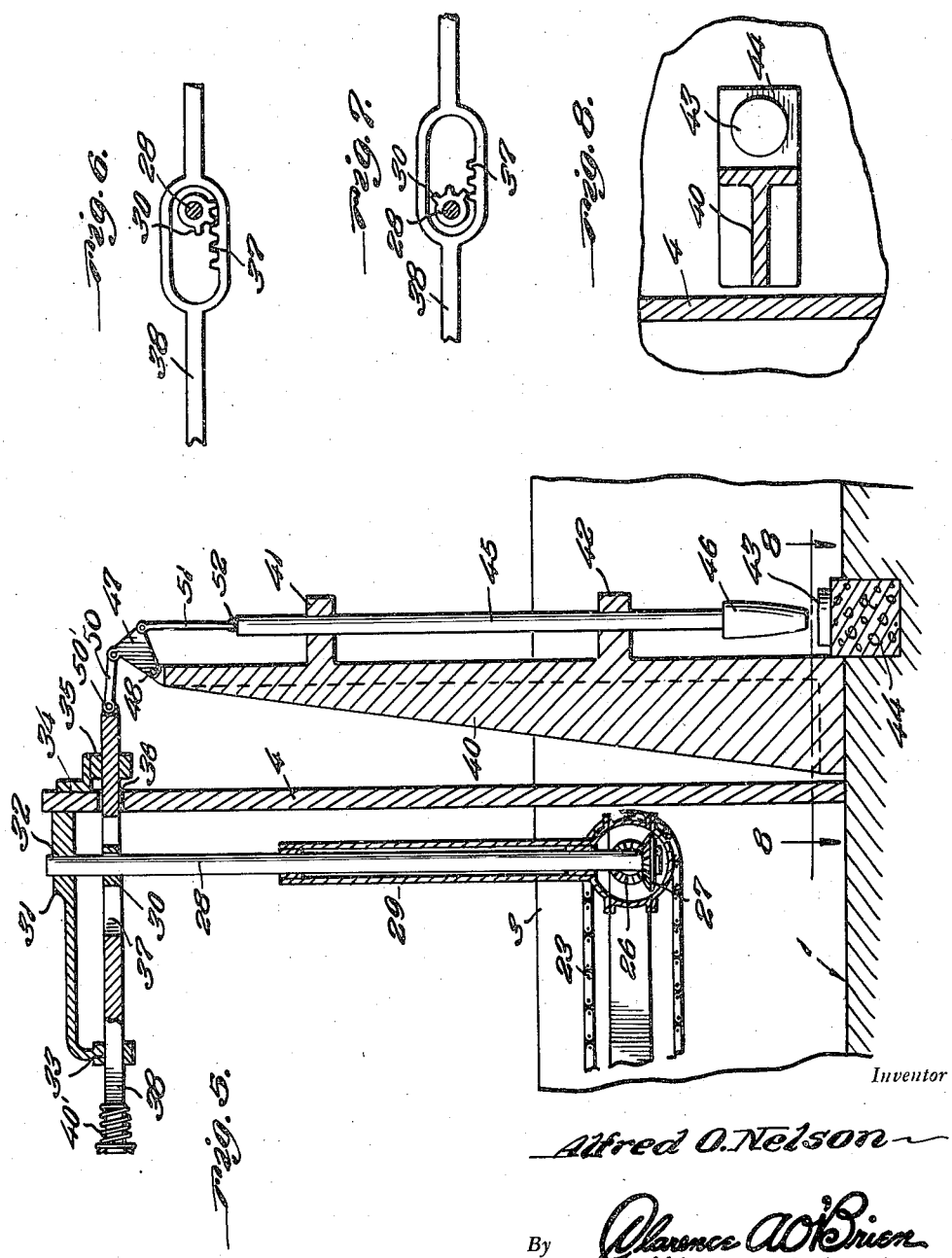

March 22, 1949.    A. O. NELSON    2,465,259
FISH SCARING DEVICE
Filed May 28, 1946    3 Sheets-Sheet 3
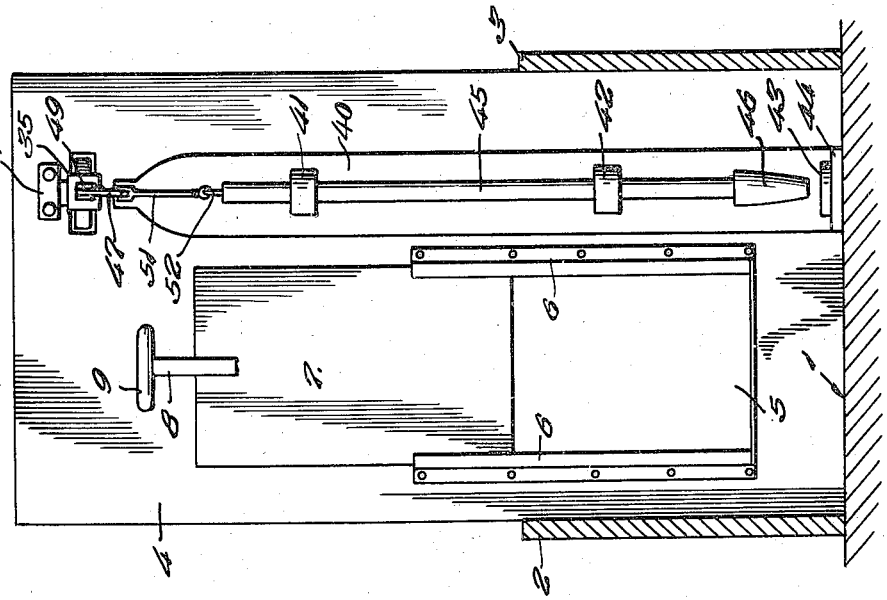
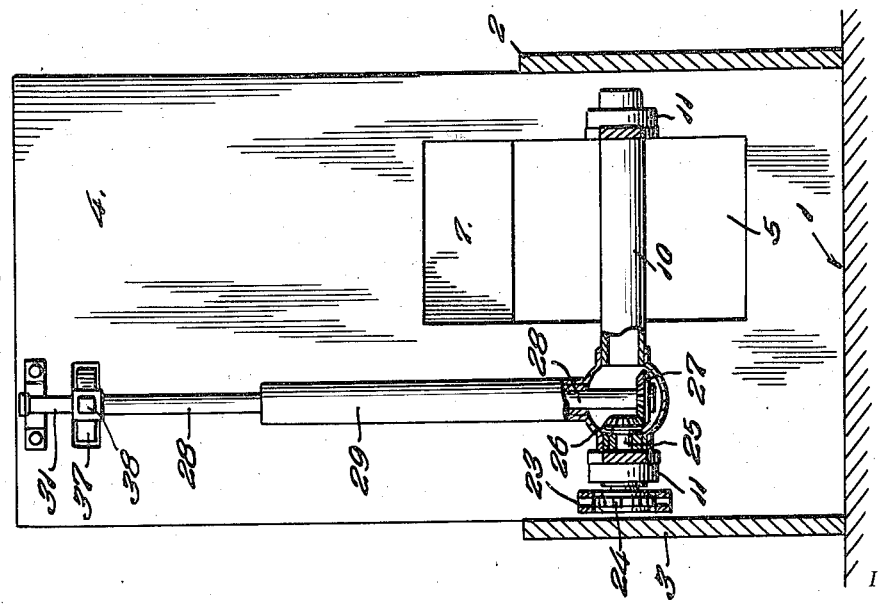
Inventor
Alfred O. Nelson
By Clarence A. O'Brien
and Harvey B. Jacobson
Attorneys Patented Mar. 22, 1949

2,465,259

UNITED STATES PATENT OFFICE 2,465,259

FISH SCARING DEVICE

Alfred O. Nelson, Columbus, Mont.

Application May 28, 1946, Serial No. 672,883

17 Claims. (Cl. 116—22)

This invention relates to improvements in apparatus for controlling the movements of fish, and more particularly to such an apparatus disclosed in my copending application Serial No. 555,839, filed September 29, 1944, now Patent Number 2,428,677, designed to preclude the passage of fish into certain restricted areas.

An object of the invention is the provision of an improved device for controlling the movements of fish to preclude the fish from entering areas, such as for example, irrigation ditches or canal feeders, or the like, where water from the stream or river is admitted through gates, normally closing said ditches or feeders.

Another object of the invention is the provision of an improved apparatus adapted to permit free passage of water through the gates, the same being provided with a device for producing an impact in the water adjacent the area, designed to startle or scare the fish away from the entrance of the restricted area.

A further object of the invention is to provide such a device which will be solely operated by the passage of water through the restricted area.

Another object of the invention is to provide a device for repeatedly producing a relatively sharp striking sound at periodic, frequent intervals, serving to cause the fish to stay away from the area of the impact.

Another object of the invention is to provide a highly efficient form of apparatus for controlling the movement of fish, which will be relatively inexpensive to manufacture and produce.

Other objects will appear as the description proceeds.

In the accompanying drawings which form a part of this application,

Figure 1 is a side elevation, partly in section of the improved apparatus embodying the features of this inventive concept;

Figure 2 is a plan view taken on the line 2—2 of Figure 1;

Figure 3 is a view partly broken away, taken on a line 3—3 of Figure 1;

Figure 4 is a view taken on the line 4—4 of Figure 1;

Figure 5 is a vertical sectional view taken through the impact producing apparatus;

Figure 6 is a plan view of a reciprocating rack bar and cooperating mutilated gear at one end of its throw;

Figure 7 is a plan view of the reciprocating rack bar and cooperating mutilated gear of the opposite end of its throw, and Figure 8 is a sectional view taken on the line 8—8 of Figure 5.

Like characters of reference are used throughout the following specification and the accompanying drawings to designate corresponding parts.

In carrying out the invention, there is provided a member generally denoted by the reference numeral 1 adapted to be positioned in a sluiceway or ditch, or the like, comprising side walls 2 and 3 and the barrier member 4 positioned transversely thereacross, provided in its face with an aperture 5 having channels 6 positioned along the longitudinal edges thereof (see Figure 4) within which is slidably positioned a gate 7 provided with an extending portion 8 and a transverse handle member 9, adapted to be opened and closed to admit water through the barrier 4 by moving the same upwardly or downwardly.

Suitable means are provided near the aperture 5 for startling or scaring away fish from the area, and precluding their passage thereinto when gate 7 is open. Such means takes the form of a transverse sleeve 10 (see Figure 3) secured, as by brackets 11, to one face of the barrier member 4. The sleeve 10 has pivotally secured thereto a U-shaped member, generally indicated at 12, comprised of two parallel extending portions 13 and 14 and a transverse portion 15. Secured to the transverse portion 15 is a weight 16 adapted to hold the parts in horizontal position, as indicated in the drawings.

If desired, a cable or rope 18, or the like, may be secured to the weight 16 in order to lift the same and its associated member 12 upwardly about the pivots formed in the ends of sleeve 10.

Positioned between the members 13 and 14 is a rotatable axle 19 on which is mounted a paddle wheel 20, or the like, adapted to be rotated by the passage of water thereover. One end of the axle 19 is provided with an extending portion, to which is secured the sprocket 22, adapted to drive a chain 23 which in turn rotates the sprocket 24, secured to one end of an axle 25 which extends inwardly through the sleeve 10. The opposite end of axle 25 is provided with a beveled gear 26 which in turn drives a second beveled gear 27 (see Figure 3), which drives an axle 28 extending upwardly through a sleeve 29, and supporting a mutilated gear 30 adjacent its upper end.

An L-shaped bracket member 31 is secured to the upper portion of the barrier member 4, and is formed with the vertical bearing 32 to its upper surface, and a horizontal bearing 33 to its depending end. A second L-shape bracket member 34 is secured on the opposite surface of the barrier member 4 and supports the depending bearing member 35. An aperture 36 is formed through the barrier member 4 in alignment with the bearings 33 and 35.

A reciprocating rack 37 in the form of an elongated loop with teeth on one inner surface is provided in the guide rod 38, adapted to be slidably received in said bearings 33 and 35, respectively, with the mutilated gear 30 in mesh with the rack 37, the said rack being operated and reciprocated by the rotary movement of the mutilated gear 30, which is operated by the paddle wheel 20. A coil shock absorbing spring 40' is mounted about the end of the guide rod 38 and is adapted to take up the shock when the rack is pulled forwardly in a manner later to be described.

A standard 40 of I-beam construction is secured to the bottom of the member 1 on the opposite side of the barrier member 4 from the water wheel 20, and is formed with the outwardly extending vertical spaced apertured bearing ears 41 and 42, and a cooperating anvil 43 is suitably anchored in cement 44 directly below the said ears. A shaft 45 is reciprocably mounted to the apertured bearing ears 41 and 42 and supports a hammer 46 on its lower end for providing a series of sharp percussive blows when the hammer repeatedly strikes said anvil.

A triangular shaped walking beam 47 is pivoted at 48 at the upper end of the standard 40, and is connected by the link 50 to an eye 50' in the forward end of the guide rod 38, and by the link 51 to an eye 52 in the upper end of the shaft 45.

From the foregoing description, the mode of operation of the improved device will be readily understood, but will be described as follows:

When the gate 7 is raised by means of the handle 9, water will be passed through the aperture 5 in the barrier member 4 and will strike the water wheel 20 causing the same to revolve, which motion is transmitted by means of the sprockets 22 and 24 and interconnected chain 23 to the shaft 25. Rotation of the shaft 25 will rotate the interconnected gears 26 and 27 causing the vertical shaft 28 to rotate, said shaft supporting the mutilated gear 30 adjacent its upper end. The gear 30 will mesh with the rack 37 to move the same to pull in on the walking beam 47, thereby raising the hammer 46 from off its anvil 43. When the gear 30 reaches the end of the rack 37, continued rotation will permit the rack to be pulled over sharply to the opposite end thereby dropping the hammer 46 on the anvil 43, causing a relatively sharp striking sound, said hammer and anvil being below the surface of the water will cause the sound to be transmitted to adjacent areas to scare the fish away from the device and to preclude their passing through the aperture 5 in the barrier 4 to the ditch or feeder. When the rack 37 has been pulled over thereby dropping the hammer the spring 40' will engage the end of the bracket 31 substantially at the same instant that the hammer strikes the anvil, thereby acting as a shock absorber for the mechanism. A series of relatively sharp striking percussive sounds at periodic, frequent intervals will be produced as long as the gate 7 is raised to permit water to pass through the device, hence the fish will be scared away from the area during the time in which water is allowed to pass into the ditch or feeder.

It is intended that the mechanical parts of the apparatus be enclosed in a grease-tight case and provided with wood bearings which could be easily replaced if necessary, so that the apparatus would last for a long period of time with very little attention and expense. It will be understood that the grease-tight case has been omitted to more clearly illustrate the operative mechanism of the invention.

From the foregoing description, it will be seen that there has been provided a highly efficient and effective means and apparatus for controlling the movement of fish.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent in the United States is:

1. A device for frightening fish comprising a barrier having an aperture, a closure secured to said barrier for selectively permitting free flow through and completely closing the aperture, walls fixed to said barrier forming a passageway, a source of power, an axle journaled on said barrier, means for drivingly connecting said axle and said source of power, a rod slidingly journaled in and extending through said barrier, a bracket secured to said barrier supporting said rod, means including a gear drivingly connecting said rod to said axle for actuation of said rod in a single direction, a walking beam, means for pivotally securing said beam to said rod, a shaft, means for pivotally securing said shaft to said beam to transmit the single direction movement of said rod to said shaft, the shaft being moved in the opposite direction by gravity, sound producing means associated with said shaft and rendered operative upon movement of said shaft after it has been set in motion by the pull of gravity, resilient means on said rod and seated on said bracket for absorbing shock.

2. A device for frightening fish comprising a barrier having an aperture, a closure secured to said barrier for selectively permitting free flow through and completely closing the aperture, walls secured to said barrier, a source of power, an axle journaled on said barrier, means for drivingly connecting said axle and said source of power, a rod slidingly journaled in and extending through said barrier, a bracket secured to said barrier and supporting said rod, gear means for drivingly connecting said rod to said axle, a walking beam, means for pivotally securing said beam to said rod, a shaft, means for pivotally securing said shaft to said beam, sound producing means associated with said shaft, resilient means on said rod and seated on said bracket for absorbing shock, said gear means including a rack on said rod, a mutilated gear secured to said axle engaging said rack, thereby drivingly urging said rod in a single direction, the rod being actuated in the opposite direction by the force of gravity to render said sound producing means operative.

3. The combination of claim 2 wherein said source of power includes a paddle wheel carried by said barrier.

4. The combination of claim 2; each of said pivotal securing means comprising pitman rods.

5. The combination of claim 2; said sound producing means comprising a hammer secured to said shaft and an anvil thereadjacent.

6. The combination of claim 1; said sound producing means including a hammer secured to said shaft and an anvil thereadjacent, adapted to be struck by said hammer.

7. In a device for frightening fish, a barrier having an aperture, spaced walls secured to said barrier, a closure secured to said barrier adjacent said aperture, a bracket secured to said barrier, an axle journaled in said bracket, means for rotating said axle, a standard adjacent said barrier having a shaft journaled thereon, a rod journaled in said barrier, means associated with said rod and said axle for actuating said rod in a single direction to lift said shaft and for releasing said rod to allow said shaft to be returned by gravity, means for drivingly connecting said shaft and said rod, sound producing means associated with said shaft rendered operative upon the return of said shaft.

8. In a device for frightening fish, a barrier having an aperture, spaced walls secured to said barrier, a closure secured to said barrier adjacent said aperture, a bracket secured to said barrier, an axle journaled in said bracket, means for rotating said axle, a standard adjacent said barrier having a shaft journaled thereon, a rod journaled in said barrier, means associated with said rod and said axle for actuating said rod in a single direction to lift said shaft and for releasing said rod to allow said shaft to be returned by gravity, means for drivingly connecting said shaft and said rod, sound producing means associated with said shaft rendered operative after said shaft has been released, said single direction actuation means including a rack secured to said rod, a mutilated gear secured to said axle engaging said rack.

9. In a device for frightening fish, a barrier having an aperture, spaced walls secured to said barrier, a closure secured to said barrier adjacent said aperture, a bracket secured to said barrier, an axle journaled in said bracket, means for rotating said axle, a standard adjacent said barrier having a shaft journaled thereon, a rod journaled in said barrier, means associated with said rod and said axle for actuating said rod in a single direction to lift said shaft and for releasing said rod to allow said shaft to be returned by gravity, means for drivingly connecting said shaft and said rod, sound producing means associated with said shaft rendered operative after said shaft has been released, said single direction actuation means including an eye member associated with said rod, links attached to said eye member and said shaft, a mutilated gear secured to said axle, a rack gear integral with said eye member engaging said mutilated gear.

10. In a device for frightening fish, a barrier having an aperture, spaced walls secured to said barrier, a closure secured to said barrier adjacent said aperture, a bracket secured to said barrier, an axle journaled in said bracket, means for rotating said axle, a standard adjacent said barrier having a shaft journaled thereon, a rod journaled in said barrier, means associated with said rod and said axle for actuating said rod in a single direction to lift said shaft and for releasing said rod to allow said shaft to be returned by gravity, means for drivingly connecting said shaft and said rod, sound producing means associated with said shaft rendered operative after said shaft has been released, said single direction actuation means including a rack secured to said rod, a mutilated gear secured to said axle engaging said rack, said drivingly connecting means including a walking beam pivoted to said standard, pitman rods secured to said beam and pivotally associated with said shaft and said axle respectively.

11. In a device for frightening fish, a barrier having an aperture, spaced walls secured to said barrier, a closure secured to said barrier adjacent said aperture, a bracket secured to said barrier, an axle journaled in said bracket, means for rotating said axle, a standard adjacent said barrier having a shaft journaled thereon, a rod journaled in said barrier, means associated with said rod and said axle for actuating said rod in a single direction to lift said shaft, means for drivingly connecting said shaft and for releasing said rod to allow said shaft to be returned by gravity, sound producing means associated with said shaft rendered operative after said shaft has been released, and a shock absorber secured to said rod and reacting on said barrier.

12. In a device for frightening fish, a barrier having an aperture, spaced walls secured to said barrier, a closure secured to said barrier adjacent said aperture, a bracket secured to said barrier, an axle journaled in said bracket, means for rotating said axle, a standard adjacent said barrier having a shaft journaled thereon, a rod journaled in said barrier, means associated with said rod and said axle for actuating said rod in a single direction to lift said shaft and for releasing said rod to allow said shaft to be returned by gravity, means for drivingly connecting said shaft and said rod, sound producing means associated with said shaft rendered operative after said shaft has been released, said single direction actuation means including a rack secured to said rod, a mutilated gear secured to said axle engaging said rack, said drivingly connecting means including a walking beam pivoted to said standard, pitman rods secured to said beam and pivotally associated with said shaft and said axle respectively, said sound producing means including an inertia member secured to said shaft engageable with an anvil.

13. In a fish frightening device, a standard having a shaft mounted for axial movement thereon, means for raising said shaft and releasing said shaft after raising said shaft a predetermined amount, said shaft being gravity lowered, and sound producing means associated with said shaft rendered operative when said shaft has reached substantially the lowermost position thereof.

14. A fish frightening device comprising a barrier having an opening, a source of power, means attached thereto to support said source of power adjacent said opening, a gate adjacent said opening to control liquid flow therethrough, a standard adjacent said barrier, a vertical shaft mounted for reciprocation thereon, means actuated by said source of power for raising said vertical shaft and for releasing said shaft after it has been raised, the said shaft being gravity lowered, and sound conducive means associated with said shaft and responsive to a predetermined position of said shaft during a reciprocatory cycle of operation thereof.

15. The combination of claim 14 and said source of power comprising a vaned water wheel.

16. The combination of claim 15 and said vertical shaft raising and releasing means including a substantially horizontal rod slidably secured to said barrier, means transmitting horizontal movement of said rod to vertical movement of said shaft, a gear attached to said rod, and a mutilated gear driven by said water wheel emmeshed therewith.

17. The combination of claim 16 and a shock reducing spring seated on said rod and reacting on said barrier.

ALFRED O. NELSON.

REFERENCES CITED

The following references are of record in the file of this patent:

UNITED STATES PATENTS

| Number | Name | Date |
|---|---|---|
| 28,807 | Gates et al. | June 19, 1860 |
| 390,764 | Flaherty | Oct. 9, 1888 |
| 1,080,415 | Chandler | Dec. 2, 1913 |
| 1,263,267 | Masillan | Apr. 16, 1918 |
| 1,269,058 | Crisp et al. | June 11, 1918 |
| 1,596,310 | Sampson | Aug. 17, 1926 |
| 2,428,677 | Nelson | Oct. 7, 1947 |